UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

ORANGE COTTON-DYES.

995,160. Specification of Letters Patent. Patented June 13, 1911.

No Drawing. Application filed December 13, 1910. Serial No. 597,061.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hessen, Germany, with the post-office address Gerberstrasse No. 5, have invented new and useful Improvements in Orange Cotton-Dyes, of which the following is a specification.

I have discovered that valuable cotton dyestuffs are obtained by combining the tetrazo compounds of para-diamins of the general formula:

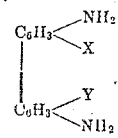

wherein X and Y, meaning H or $SO_3H$, are in ortho position to the amino group, with one molecular proportion of 1-sulfoaryl-3-methyl-5-pyrazolone and one molecular proportion of an aromatic nitrometadiamin. The thus obtained dyestuffs dye cotton orange to orange-red shades, fast to copper and showing a remarkable fastness to light. Among paradiamins benzidin, its ortho-mono and ortho disulfonic acids may be used; among nitrometadiamins nitrometaphenylendiamin and nitrometa-toluylendiamin may be employed.

The following example will serve to illustrate the nature of my invention and how it can be carried out; parts being by weight.

Example: 13.2 parts of benzidinmonosulfonic acid ($NH_2:SO_3H=1:2$) are dissolved in the necessary quantity of water containing 3 parts of sodium carbonate, and tetrazotized in the usual manner by means of 33 parts of hydrochloric acid 20° Bé. and 6.9 parts sodium nitrite. A solution of 12.7 parts of 1-para-sulfophenyl-3-methyl-5-pyrazolone, neutralized by means of sodium carbonate, is allowed to flow into the tetrazo compound, whereupon 24 parts of sodium acetate are added. After formation of the intermediate product a solution of 7.7 parts of nitrometaphenylendiamin in 300 parts of water and 12 parts of hydrochloric acid 20° Bé. is poured into the mixture, whereupon 36 parts of sodium acetate are added. The mixture is stirred until the formation of dyestuff is completed, neutralized by means of sodium carbonate, heated up to 70° C., and the dyestuff precipitated by addition of common salt. It is in dry state a reddish-brown powder dissolving in concentrated sulfuric acid with reddish-orange, in water with more yellowish color. The aqueous solution is hardly altered by addition of caustic soda lye. By addition of concentrated hydrochloric acid the dyestuff is precipitated in shape of orange flakes. It dyes cotton reddish-orange shades very fast to light and acids.

On using benzidin ortho-disulfonic acid or benzidin instead of benzidinmonosulfonic acid, dyestuffs are obtained which dye cotton almost the same shades. On replacing the para-sulfo-phenyl-methyl-pyrazolone with para sulfo-ortho-tolylmethyl-pyrazolone dyestuffs are obtained which dye cotton more yellowish shades. In analogous manner may be performed the combinations with nitrometatoluylendiamins.

Now what I claim and desire to secure by Letters Patent is the following:

1. The process for manufacturing orange to orange-red cotton dyestuffs, consisting in combining the tetrazo compounds of para-diamins of the benzene series with one molecular proportion of 1-sulfoaryl-3-methyl-5-pyrazolone and one molecular proportion of an aromatic nitrometadiamin.

2. The process for manufacturing orange cotton dyestuffs, consisting in combining the tetrazo compounds of benzidin-orthomonosulfonic acid with one molecular proportion of 1-sulfo-aryl-3-methyl-5-pyrazolone and one molecular proportion of an aromatic nitrometadiamin.

3. As new articles the dyestuffs obtained by combining the tetrazo compounds of benzidin-ortho-monosulfonic acid with one molecular proportion of 1-sulfoaryl-3-methyl-5-pyrazolone and one molecular proportion of an aromatic nitro-meta-diamin, which dyestuffs are reddish brown powders, dissolving in concentrated sulfuric acid with reddish orange, in water with more yellowish color, which dyestuffs dye cotton orange to orange-red shades of good fastness to light and acids, yielding upon reduction with stannous chlorid and hydrochloric acid benzidin-ortho-monosulfonic acid, and 1-sulfoaryl-3-methyl-4-amino-5-pyrazolone and an aromatic triamin.

4. The process for manufacturing an orange cotton dyestuff, consisting in combining the tetrazo compound of benzidin-ortho-monosulfonic acid with one molecular proportion of 1-sulfo-phenyl-3-methyl-5-pyrazolone and one molecular proportion of nitro-meta-phenylendiamin.

5. As a new article the dyestuff obtained by combining the tetrazo compound of benzidin-ortho-monosulfonic acid with one molecular proportion of 1-sulfophenyl-3-methyl-5-pyrazolone and one molecular proportion of nitro-meta-phenylen-diamin, which dyestuff is in dry state a reddish-brown powder dissolving in concentrated sulfuric acid with reddish-orange, in water with more yellowish color, the aqueous solution of which hardly being altered by addition of caustic soda lye, the dyestuff being precipitated thereof in shape of orange flakes by addition of concentrated hydrochloric acid, which dyestuff dyes cotton reddish orange shades of good fastness to light and acids, yielding upon reduction with stannous chlorid and hydrochloric acid, benzidin-ortho-monosulfonic acid, 1-sulfophenyl-3-methyl-4-amino-5-pyrazolone and triaminobenzene.

In testimony, that I claim the foregoing as my invention, I have signed my name in presence of two witnesses, this second day of December 1910.

AUGUST LEOPOLD LASKA

Witnesses:
  HERMANN WECH,
  EMMA MARX.